F. H. BALLOU.
PRODUCT ASSORTING AND DISTRIBUTING MACHINE.
APPLICATION FILED NOV. 29, 1919.

1,346,438. Patented July 13, 1920.
2 SHEETS—SHEET 2.

INVENTOR.
BY
ATTORNEY.

UNITED STATES PATENT OFFICE.

FRANK H. BALLOU, OF NEWARK, OHIO.

PRODUCT ASSORTING AND DISTRIBUTING MACHINE.

1,346,438.  Specification of Letters Patent.  Patented July 13, 1920.

Application filed November 29, 1919. Serial No. 341,497.

*To all whom it may concern:*

Be it known that I, FRANK H. BALLOU, a citizen of the United States of America, and resident of Newark, in the county of Licking and State of Ohio, have invented certain new and useful Improvements in Product Assorting and Distributing Machines, of which the following is a specification.

This invention relates to fruit sizers and particularly to a novel principle whereby apples or other globular or nearly globular fruits may be sized and delivered into separate receptacles.

An object of the invention is to provide a compact, readily portable, light operating fruit sizing machine for small growers; furthermore, to protect from bruises or other injury by well padded surfaces throughout, with which the fruit may come in contact; furthermore, to utilize the principle in sizing the product of a series of gradually enlarging triangular openings which measures the product through three of its diameters.

The term product is used in a generical way, so as to include any materials or objects which are suspectible of separation according to size and I will hereafter employ that term with this understanding.

A further object of this invention is to provide means for supplying products to the separating device and for conveying the same therefrom, means being provided to receive the said product after its separation according to size.

With the foregoing and other objects in view, the invention consists in the details of construction and in the arrangement and combination of parts to be hereinafter more fully set forth and claimed.

In describing the invention in detail, reference will be had to the accompanying drawings forming part of this specification wherein like characters denote corresponding parts in the several views, and in which—

Figure 1:
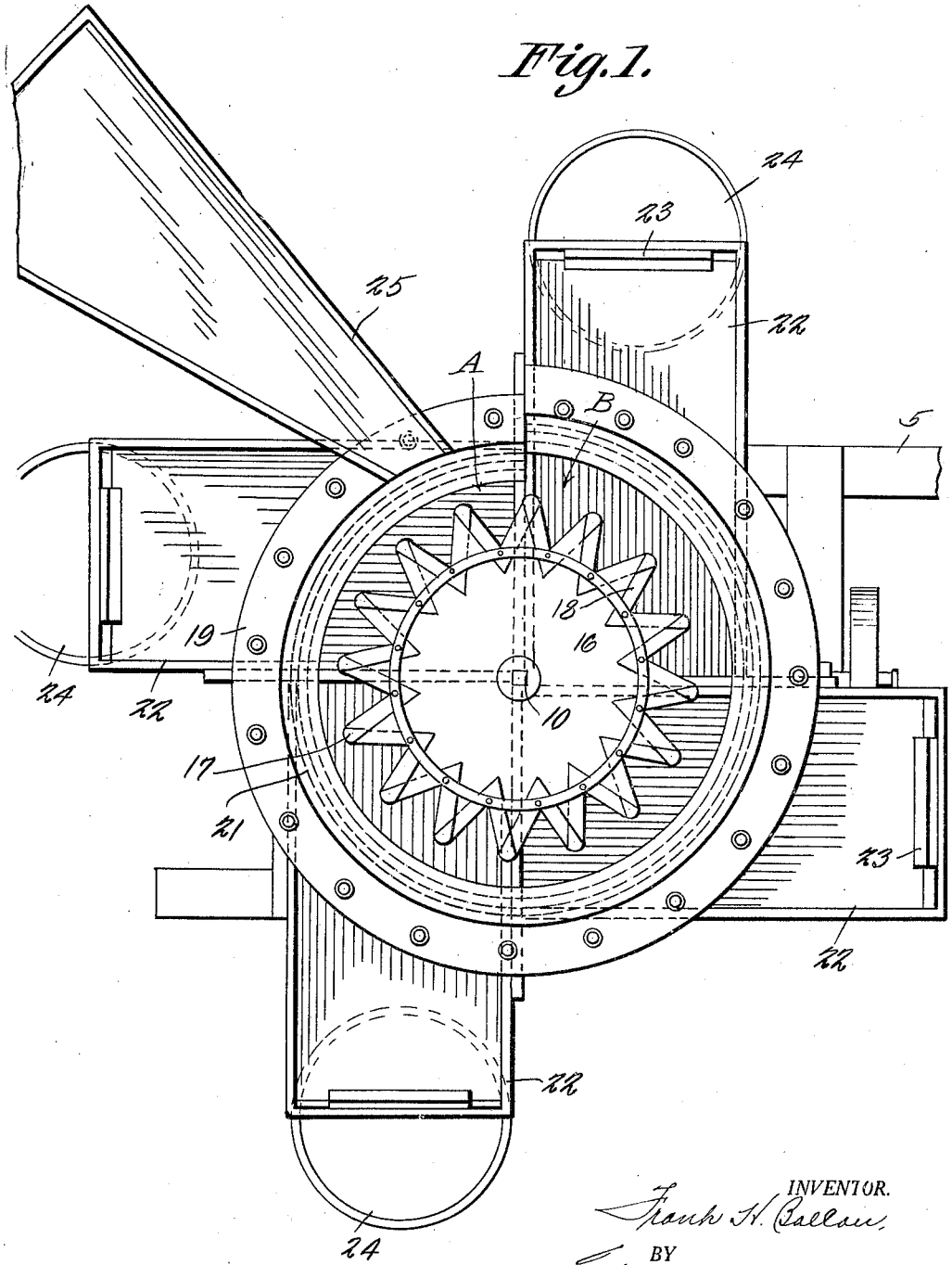
Figure 1 illustrates a top plan view of the device embodying the invention.
Figure 2:
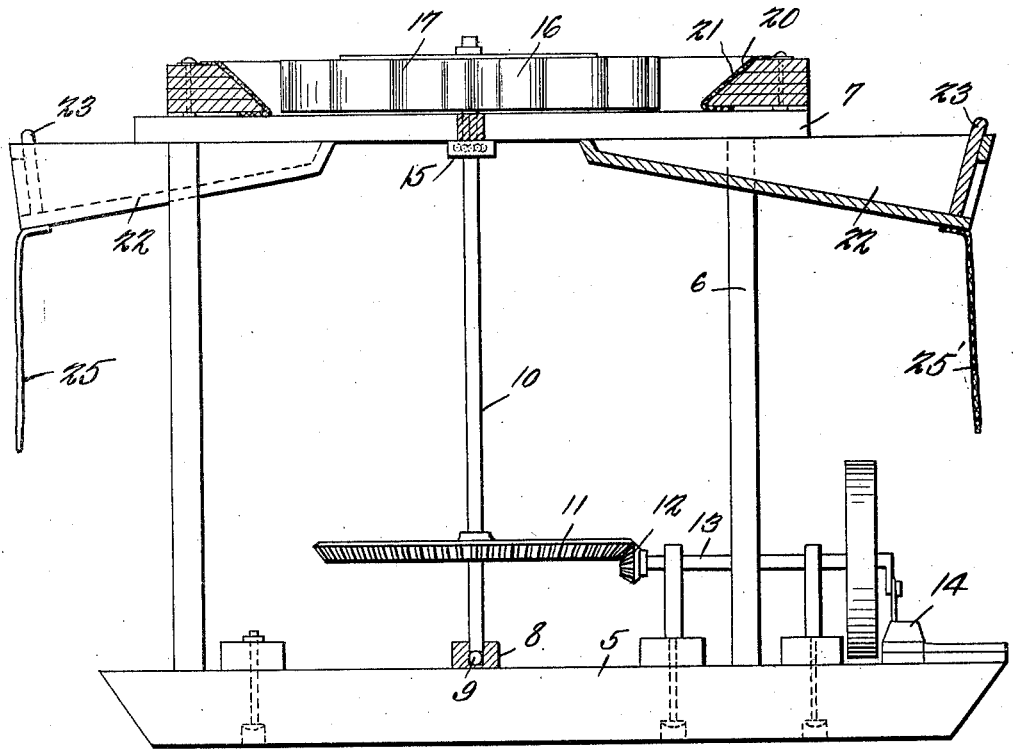
Fig. 2 is a vertical sectional view thereof.

In these drawings, 5 denotes a base; 6, posts supported thereby, the said posts acting as supports for a ring frame 7 which supports the structure including the means for supplying and discharging the product.

The bearing 8 is supported by the base and it may have suitable anti-friction devices 9 on which the end of the vertically disposed shaft 10 is rotatable. A gear wheel 11 is secured to the shaft 10 and the gear wheel is in mesh with a pinion 12 on the shaft 13. The shaft may be driven by a motor 14 which is conventionally shown and may consist of an electrically driven or power driven device the detail of which is immaterial.

The shaft 10 near its upper end is journaled in suitable bearings 15 and the upper end of the shaft carries a distributing wheel 16, the periphery of which has V-shaped recesses or notches 17, the surfaces of which have cushions or pads 18 applied to them, the purpose being of course to have this padding of such thickness and flexibility as to engage the product without bruising or marring it.

The ring frame 7 constitutes a support for a rim 19, having a beveled inner surface 20 provided with a cushion or padding 21, to be engaged by the product. As shown in the drawing, the inner surface of the rim recedes toward the top and the rim is arranged in such relation to the distributing wheel as to gradually increase the space between the said wheel and the said rim, so that the rim might be said to be eccentric with relation to the said wheel. The space between the rim and the wheel is smallest at the point A and greatest at the point B; and obviously the smallest products would escape first and the products of greater size would escape later as carried around by the distributing wheel.

Discharge spouts or troughs 22 are arranged at angles to each other under the distributing wheel and the outer ends of these troughs have gates 23 to control the passages of the product therefrom and the outer end of these troughs may be supplied with any suitable receptacle 24 such as a bag or basket which is also conventionally shown.

A chute or delivery hopper 25 has its inner end terminating over the rim and it is intended to deliver the product to the distributing wheel where the space between the wheel and the rim is small and the product which does not escape through the openings between the distributing wheel and the rim in the first trough, will be carried around until the opening is sufficiently large to permit its escape, when it will be discharged into an appropriate trough according to its size.

Figure 3:
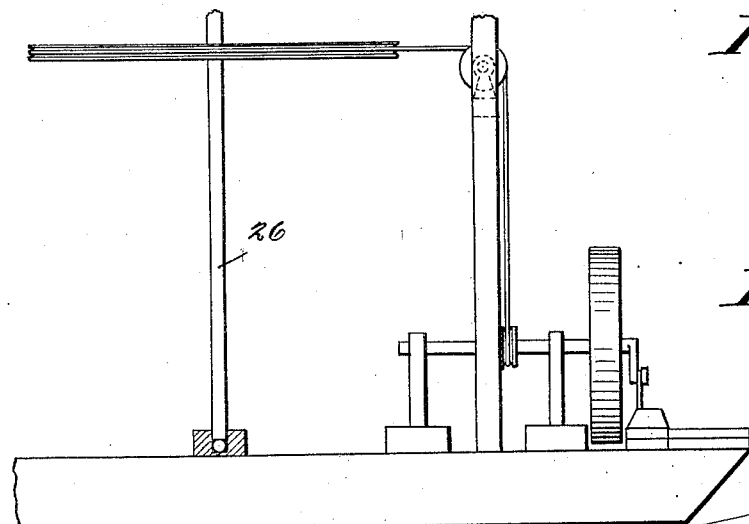
Fig. 3 is a side elevation of a modified means for operating the sizing wheels.

In the modification shown in Fig. 3, the shaft 26 corresponding to the shaft 10 is driven through the belt and pulley arrangement which is well illustrated and under certain conditions, this could be substituted for the gearing, although any appropriate means may be provided for rotating or turning the distributing wheel with relation to the rim.

I claim:

A product assorting device comprising a frame, a shaft rotatably mounted therein, a distributing wheel having notches in its periphery approximately V-shaped in plan and having padded surfaces, a rim encircling the wheel, the said rim being eccentric to the periphery of the distributing wheel and having an inner beveled edge inclined toward the wheel and a cushion on said beveled surface.

FRANK H. BALLOU.